US007793307B2

(12) United States Patent
Gokhale et al.

(10) Patent No.: US 7,793,307 B2
(45) Date of Patent: Sep. 7, 2010

(54) APPARATUS AND METHOD FOR PROVIDING VIRTUALIZED HARDWARE RESOURCES WITHIN A VIRTUAL EXECUTION ENVIRONMENT

(75) Inventors: Geeta Gokhale, Maharashtra (IN); Timothy J. Clayton-Luce, Raleigh, NC (US); Umesh Venkatesh, Karnataka (IN)

(73) Assignee: Network Appliance, Inc., Sunnyvale, CA (US)

( * ) Notice: Subject to any disclaimer, the term of this patent is extended or adjusted under 35 U.S.C. 154(b) by 823 days.

(21) Appl. No.: 11/784,430

(22) Filed: Apr. 6, 2007

(65) Prior Publication Data

US 2008/0250222 A1    Oct. 9, 2008

(51) Int. Cl.
*G06F 13/00* (2006.01)
(52) U.S. Cl. .................. 719/324; 719/319; 719/321; 718/1; 718/104
(58) Field of Classification Search ................ 719/324, 719/319, 321; 718/1, 104
See application file for complete search history.

(56) References Cited

U.S. PATENT DOCUMENTS

| 5,961,582 | A | * | 10/1999 | Gaines .......................... 718/1 |
| 7,558,723 | B2 | * | 7/2009 | Traut ............................ 703/24 |
| 2002/0143842 | A1 | * | 10/2002 | Cota-Robles et al. .......... 709/1 |
| 2006/0064523 | A1 | | 3/2006 | Moriki et al. |
| 2006/0143617 | A1 | * | 6/2006 | Knauerhase et al. ........ 718/104 |
| 2006/0206904 | A1 | * | 9/2006 | Watkins et al. .............. 719/321 |

OTHER PUBLICATIONS

PCT/US08/55379 Search Report and Written Opinion mailed Jul. 31, 2008.
Fujita, T. "Xen scsifront/back drivers," Xen Summit 2006, Sep. 7, 2006; XP 002488742 pp. 1-13.
Fujita, et al. "tgt: framework for storage target drivers," Proc. 2006 Ottawa Linux Symposium, vol. 1, Jul. 19, 2006; XP 002488741 pp. 47-56.

* cited by examiner

*Primary Examiner*—Andy Ho
(74) *Attorney, Agent, or Firm*—Blakely, Sokoloff, Taylor & Zafman LLP

(57) ABSTRACT

Embodiments described are generally directed to a system and method for providing virtualized hardware resources within a virtual execution environment. In one embodiment, it is determined whether an operating system (OS) is a guest OS running within a virtual execution environment of a host platform. If an OS is determined to be a guest OS within a virtual execution environment, a virtual driver is provided for the virtual execution to fetch host hardware initiator information from a host server via a virtualization layer. In one embodiment, no corresponding guest driver is available to the virtual execution environment. In one embodiment, the virtualization layer provides virtualized hardware resources, including the virtual driver, for a virtual execution environment. Using the host hardware initiator information, in one embodiment, one or more virtual storage devices may be created within the host attached storage of the host platform. Other embodiments are described and claimed.

20 Claims, 11 Drawing Sheets

APPARATUS AND METHOD FOR PROVIDING VIRTUALIZED HARDWARE RESOURCES WITHIN A VIRTUAL EXECUTION ENVIRONMENT

FIELD OF THE INVENTION

At least one embodiment of the invention pertains to storage systems, and more particularly, to a method and apparatus for providing virtualized hardware resources within a virtual execution environment.

BACKGROUND

A storage server is a special-purpose processing system used to store and retrieve data on behalf of one or more client processing systems ("clients"). A storage server can be used for many different purposes, such as, to provide multiple users with access to shared data or to backup mission critical data.

A file server is an example of a storage server. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). Another example of a storage server is a device which provides clients with block-level access to stored data, rather than file-level access, or a device which provides clients with both file-level access and block-level access. A storage server may provide direct attached/network attached storage for a host platform that is logically partitioned. As described herein, network attached storage may refer to data access to a storage server over a network such as a storage area network (SAN.)

A virtual machine architecture logically partitions a physical machine, such that the underlying hardware of the machine is time-shared and appears as one or more independently operating virtual machines (VMs). A virtual machine monitor (VMM) creates the VM and runs on a computer to facilitate, for other software, the abstraction of one or more VMs. Each VM may function as a self-contained platform, running its own operating system (OS) and application software. The software running in a VM is collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on the host platform (e.g., physical machine) which maybe referred to herein as "host hardware resources." The host hardware resources of the physical machine may include one or more processors, resources resident on the processors (e.g., control registers, caches and others), memory (instructions residing in memory, e.g., descriptor tables), and other resources (e.g., input/output devices, host attached storage, network attached storage or other like storage) that reside in the physical machine ("host platform") or are coupled to the host platform such as a file/storage server. The events may include interrupts, exceptions, platform events (e.g., initialization) (INIT) or system management interrupts (SMIs), and the like.

Hence, a VMM presents to other software ("guest software," "guests" or simply "guest") the abstraction of one or more VMs. The VMM can provide the same or different abstractions to the various guests. Each guest expects the full facilities of the host platform presented in the VM to be available for its use. For example, the guest expects to have access to all registers, caches, structures, I/O devices, memory, direct attached storage, network attached storage and the like according to the architecture of the processor and platform presented in the VM.

However, when a storage server or a file server is part of a host platform, which is partitioned or subdivided to provide one or more "virtual execution environments," such as VMs, hardware partitions or the like, the ability of guest software to access the storage server may be restricted within the virtual execution environment. In fact, unless the storage server/file server is accessible (virtualized) within the virtual execution environment, guest OS control over the storage server/file server is prohibited. As a result, access to host hardware resources that may be available from a data storage application when running within a non-virtualized host platform, may not be available when such application operates within a virtual execution environment such as a VM. For example, access to SAN commands of host network-attached storage may not be available within the virtual execution environment.

SUMMARY OF THE INVENTION

Embodiments described are generally directed to a system and method for providing virtualized hardware resources within a virtual execution environment. In one embodiment, it is determined whether an operating system (OS) is a guest OS running within a virtual execution environment of a host platform. If an OS is determined to be a guest OS within a virtual execution environment, a virtual driver is provided for the virtual execution to fetch host hardware initiator information from a host server via a virtualization layer. In one embodiment, no corresponding guest driver is available to the virtual execution environment. In one embodiment, the virtualization layer provides virtualized hardware resources (according to the host hardware resources available from the host platform,) including a virtual driver for the virtual execution environment. Using the host hardware initiator information, in one embodiment, one or more virtual storage devices may be created within the host attached storage of the host platform. Other embodiments are described and claimed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method and apparatus for providing virtualized hardware resources within a virtual execution environment are described. As described in greater detail below, in certain embodiments host hardware resources of a host platform are unavailable within a virtual execution environment. As described herein, a host hardware resource, which is initially unavailable within a virtual execution environment, may be made available to the virtual execution environment by providing a virtualized hardware resource. The virtualized hardware resource may be referred to herein as a "guest hardware resource," "guest resource" or "guest hardware." In one embodiment, a virtualization layer enables virtualization of hardware resources by providing an intermediate layer between a virtualization execution environment and the host hardware resources of the host platform.

As described herein, an execution environment refers to various host hardware resources of a host platform, as well as the various resources attached to the hardware platform and available to a software application during execution. As described herein, a "virtual execution environment" may refer to various partitions, as well as the various virtual machines or other like shared resources of a host platform. For ease of description, the term "aggregate" is sometimes used when describing the "logical aggregation of physical storage." As described herein, the term virtual machine monitor (VMM) may include, but is not limited to a virtual machine (VM) server, partition server/manager ("hypervisor,") or other like partition/VM manager.

Figure 1:
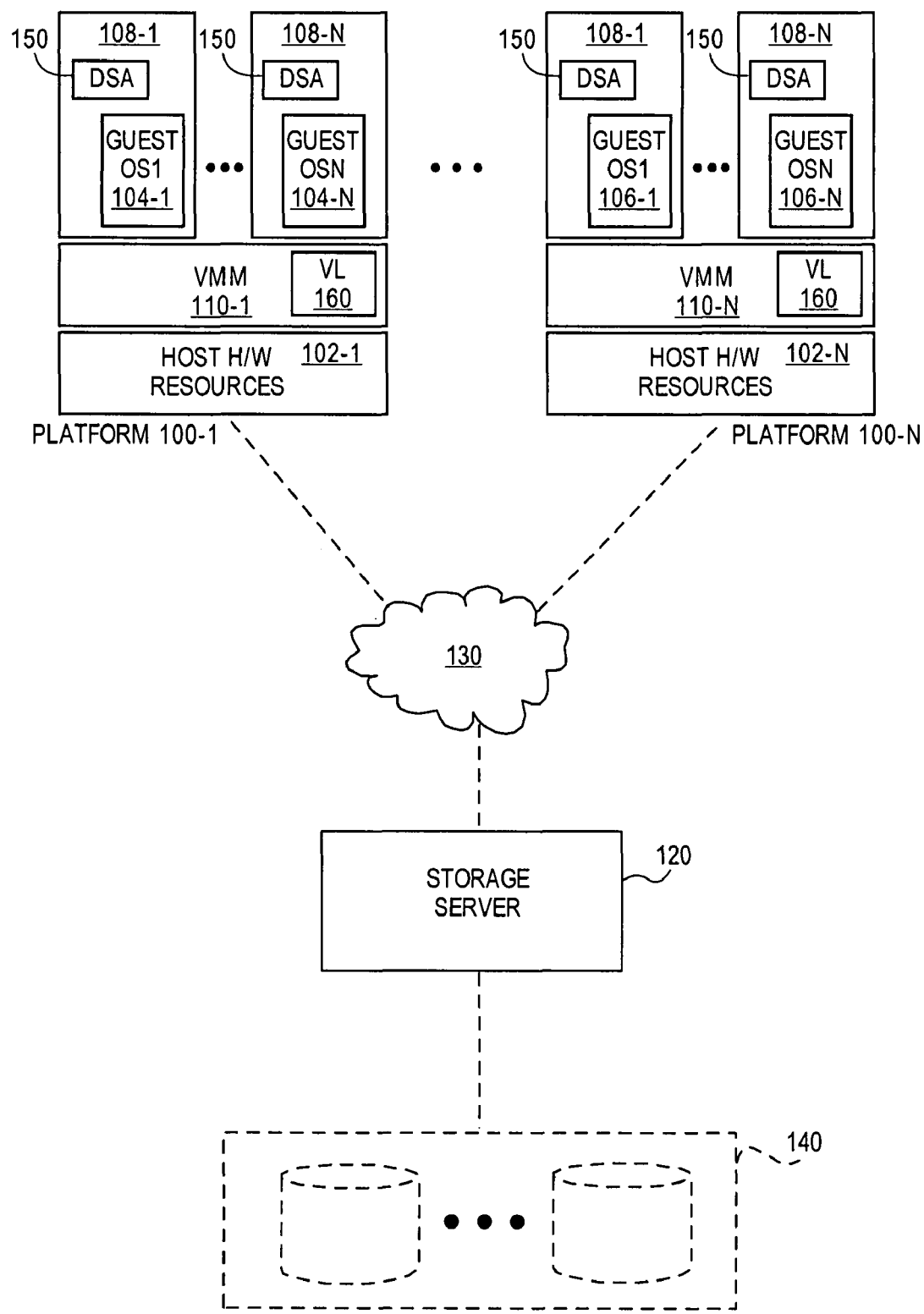
FIG. 1 shows a network environment that includes a storage server which implements one or more of the described embodiments.

As noted above, the techniques for providing virtualized hardware resources within a virtual execution environment introduced herein can be implemented in a storage server. FIG. 1 shows a simple example of a network storage environment which incorporates a storage server 120. Note, however, that the techniques for providing virtualized hardware resources within a virtual execution environment introduced herein are not limited to use in network storage systems. For example, the technique can be adapted for use in other types of storage systems, such as storage systems that operate on behalf of one or more clients to store and manage shared files in a set of mass storage devices, such as magnetic or optical storage based disks or tapes, storage systems that provide clients with block-level access to stored data, storage systems that provide access to stored data, or the like.

Storage server 120 is coupled locally to a storage subsystem 140 which includes a set of mass storage devices, and to a set of host platforms 100 (100-1, . . . , 100-N) through a network 130, such as a local area network (LAN). As described herein, the term "communicably coupled" may refer to a direct connect, a network connections, or other like connection to enable communication between devices. In one embodiment, host platforms 100 are communicably coupled to storage server 120 to enable access to host direct/network attached storage, such as storage subsystem 140.

Referring again to FIG. 1, each of the host platforms 100 may be, for example, a conventional personal computer (PC), workstation, server system, or the like. Storage subsystem 140 is managed by storage server 120. For example, storage server 120 receives and responds to various read and write requests from the host platforms 100, directed to data stored in or to be stored in storage subsystem 140. The mass storage devices in storage subsystem 140 may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data.

Storage server 120 may have a distributed architecture; for example, it may include a separate N- ("network") blade and D- (disk) blade (not shown). In such an embodiment, the N-blade is used to communicate with host platforms 100, while the D-blade includes the file system functionality and is used to communicate with the storage subsystem 140. The N-blade and D-blade communicate with each other using an internal protocol. Alternatively, storage server 120 may have an integrated architecture, where the network and data components are all contained in a single box. The storage server 120 further may be coupled through a switching fabric to other similar storage servers (not shown) which have their own local storage subsystems. In this way, all of the storage subsystems can form a single storage pool, to which any client of any of the storage servers has access.

As shown in FIG. 1, each host platform includes a virtual execution environment 108 (108-1, . . . , 108-N). As shown in FIG. 1, virtual execution environment 108 each run a separate operating system (OS) and may be referred herein as a guest OS 104. The operating systems or OS 104 of virtual execution environment 108 are referred to as guest operating systems since they receive a limited view of the hardware (H/W) resources 102 (102-1, . . . , 102-N) which may include CPU, memory, I/O devices, direct/network attached storage or other hardware resources such as, for example, storage server 120, as shown in FIG. 1.

Figure 4:
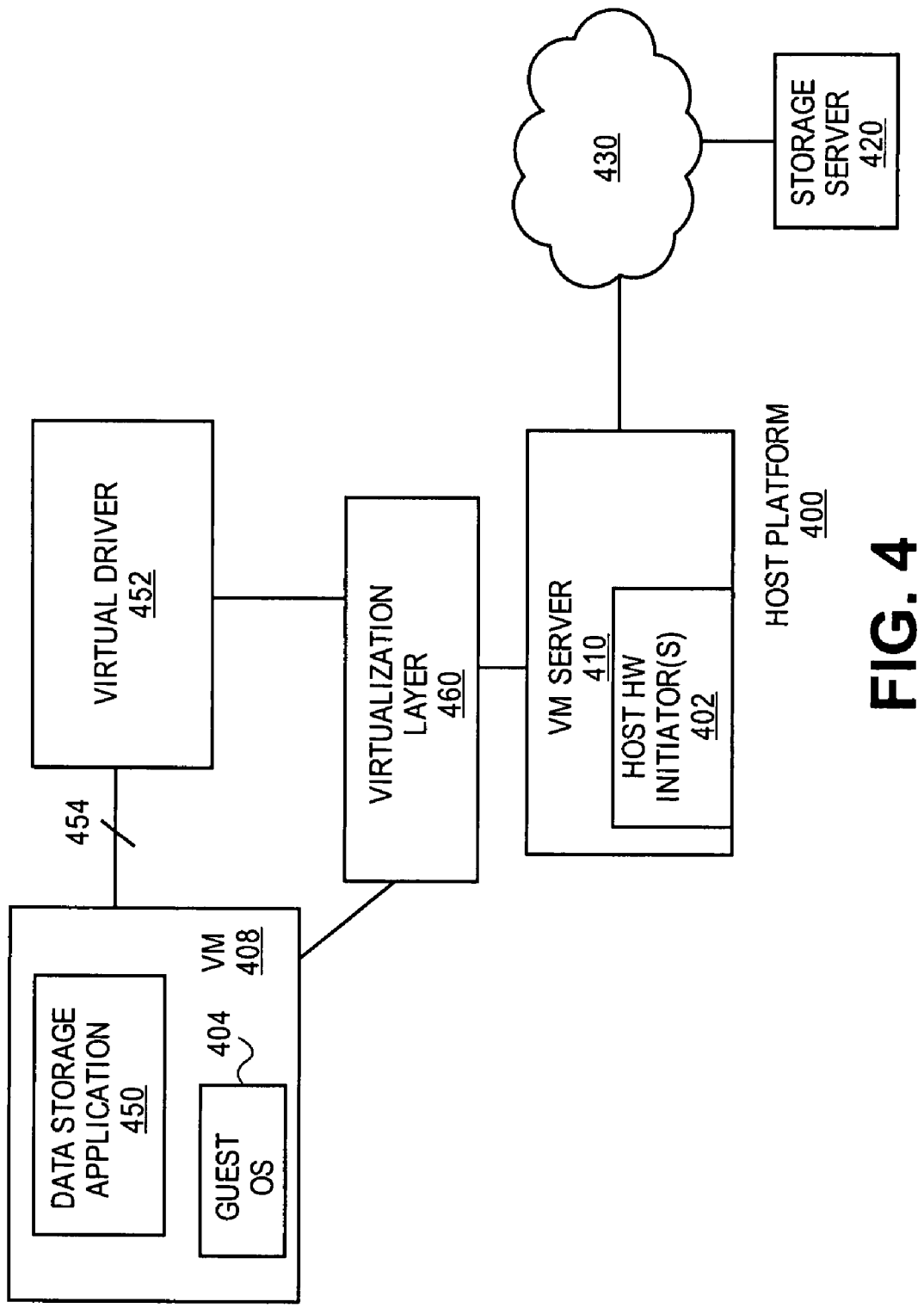
FIG. 4 is a block diagram illustrating host platform of FIG. 1 including virtualization layer to provide a virtual driver within a virtual execution environment, according to one embodiment.
Figure 5:
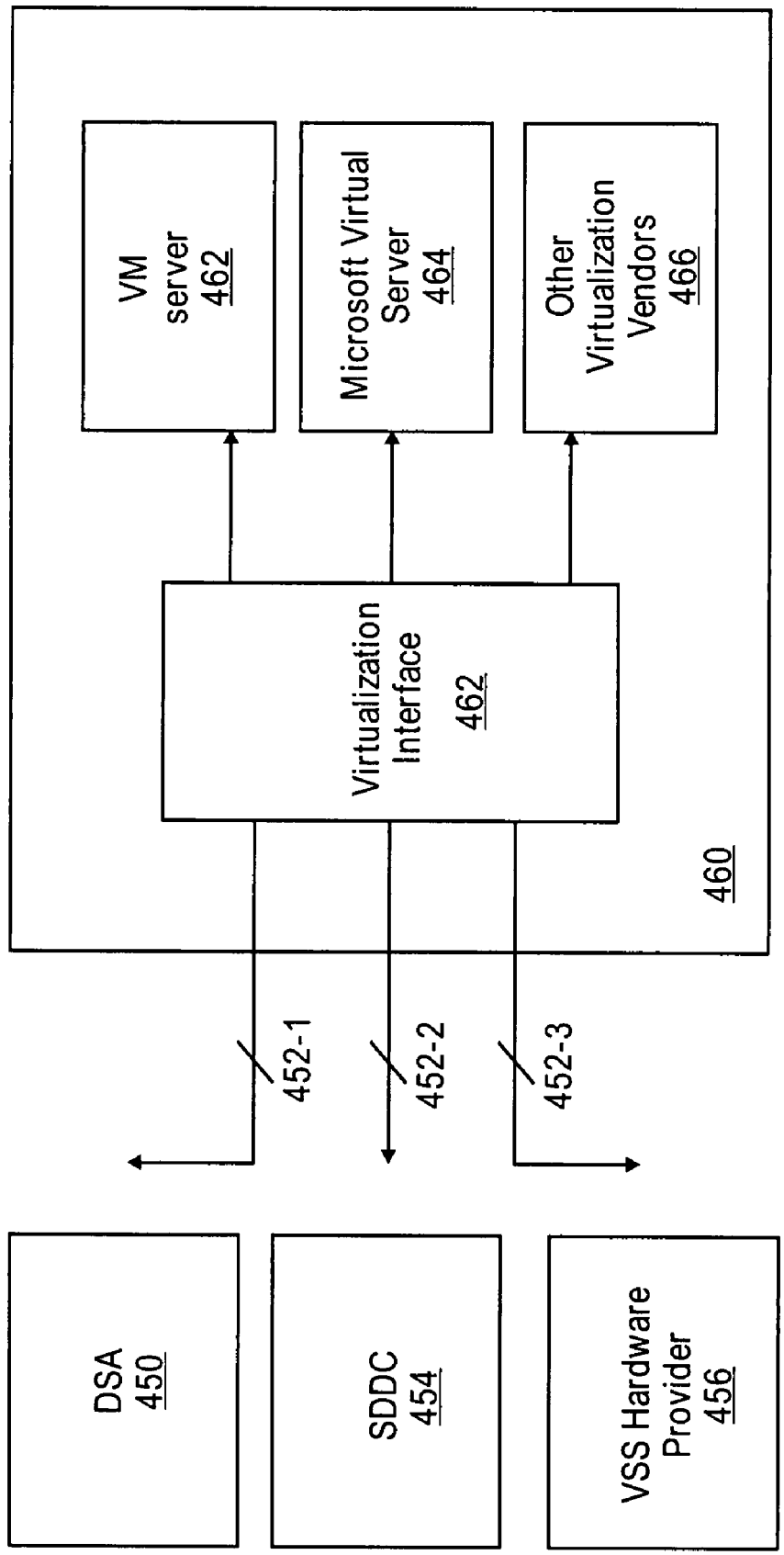
FIG. 5 further illustrates the virtualization layer of FIG. 4 which may be provided as a data link library according to one embodiment.

As shown in FIG. 1, host platforms 100 are illustrated as N-node host platforms for loading guest OS 104. Representatively, host platforms 100 are illustrated according to a stand alone virtual machine monitor (VMM) configuration, including VMMs 110 (110-1, . . . , 110-N.) As described above, a virtual machine monitor (VMM) 110 creates a virtual execution environment or VM that runs on the host platform to facilitate, for the guest OS or other software applications, the abstraction of one or more VMs. As described herein, a VMM may be referred to as a VM server, as shown in FIGS. 4 and 5.

As illustrated in FIG. 1, each virtual execution environment 108 may include a data storage application (DSA) 150 to enable certain operations on storage server 120. In one embodiment, data storage application or DSA 150 may enable backup, verify, and restore data functionality on storage server 120. The DSA application 150 may also provide logical unit number (LUN) provisioning and snap shot management for storage devices 140 via storage server 120. However, to perform such functionality, DSA 150 requires access to unavailable host hardware resources such as a hardware initiator to initiate desired functionality within storage server 120. As described herein, the term "hardware initiator" may include, but is not limited to an application specific integrated circuit (ASIC) card or other like logic to enable access to the host hardware resources such as direct/network attached storage.

As described herein, the storage devices made available by a host storage server, such as storage server 120 shown in FIG. 1, may be referred to by as a "logical unit number" (LUN.) As described herein, a LUN may refer to a logical data container that looks like a disk to a host (client) but which actually may be distributed across multiple disks by storage server 120. As further described herein, a virtual storage device (disk) may refer to the virtualization or appearance of a local disk for applications that require locally or direct attached storage. As further described herein, "virtual storage devices", or "virtual disks" may be referred to as units of storage that are designated for use by one or more host platform as managed by a storage server, such as host storage server 120 shown in FIG. 1.

As further described herein, virtual disks are referred to as logical unit numbers or LUNs when accessed over an Internet (i) small computer system interface (SCSI) (iSCSI), fiber channel protocol (FCP) or other like storage access protocols. The FCP protocol may facilitate storage access through fiber channel host bus adaptors (HBAs) and storage area networks (SANs.) The iSCSI protocol provides storage access when the host storage server is coupled to the host platform using Gigabit Ethernet or other like storage access protocol.

As mentioned above, a VMM such as VMM 110 may restrict certain hardware resources of the host hardware, such as host hardware 102. As a result, corresponding guest hardware resources are not available ("virtualized") within virtual execution environment 108. Accordingly, each VMM 110 may include a virtualization layer (VL) 160. In one embodiment, virtualization layer 160 provides one or more virtualized hardware resources for each virtual execution environment to enable DSA application 150 with access to storage server 120 to enable desired user requested functionality. In one embodiment, DSA application 150 is a storage utility that enables the LUNs or data storage devices managed by a storage server to appear as locally attached, physical disks of a host platform. Further details regarding DSA application 150, as well as virtualization 160, are further illustrated with reference to FIGS. 4 and 5.

Figure 2:
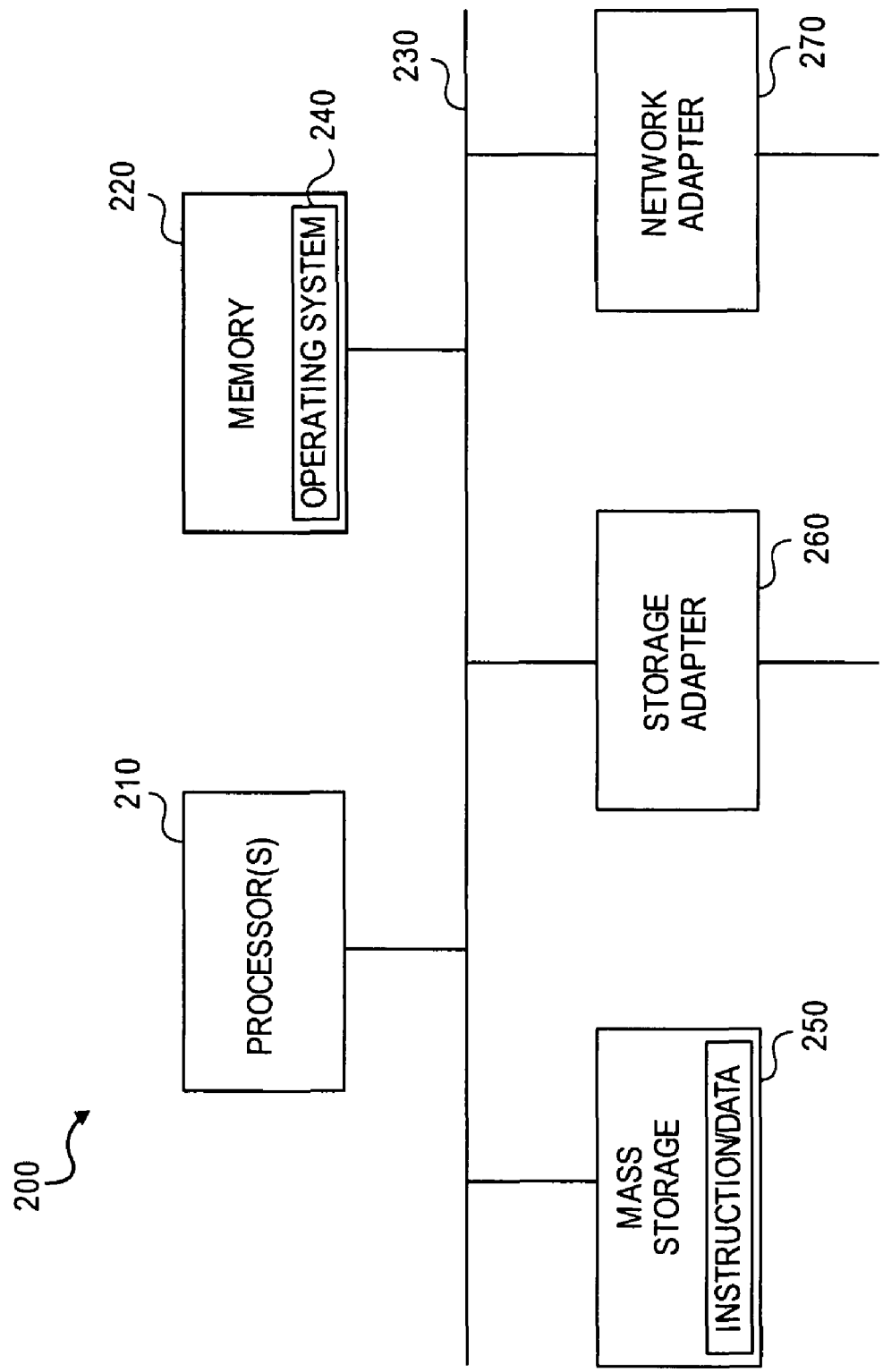
FIG. 2 is a block diagram showing the architecture of a storage server that can implement one or more of the described embodiments.

FIG. 2 is a block diagram showing the architecture of storage server 120, according to certain embodiments of the invention. Certain standard and well-known components which are not germane to the embodiment may not be shown. Storage server 120 includes one or more processors 210 and memory 220 coupled to a system interconnect 230. System interconnect 230 shown in FIG. 2 is an abstraction that represents any one or more separate physical buses and/or point-to-point connections, connected by appropriate bridges, adapters and/or controllers. System interconnect 230, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Processors 210 are the central processing units (CPUs) of a storage server (e.g., storage sever 120, shown in FIG. 1) and, thus, control the overall operation of the storage server. In certain embodiments, processors 210 accomplish this by executing software stored in memory 220. Processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 is or includes the main memory of storage server 120. Memory 220 represents any form of random access memory (RAM), read-only memory (ROM), flash memory, or the like, or a combination of such devices. Memory 220 stores, among other things, operating system 240 of storage server 120, in which the capacity guarantee techniques introduced above can be implemented.

Also connected to processors 210 through the system interconnect 230 are one or more internal mass storage devices 250, a storage adapter 260, and a network adapter 270. Internal mass storage devices 250 may be or include any conventional medium for storing large volumes of data in a non-volatile manner, such as one or more magnetic or optical based disks. The storage adapter 260 allows storage server 120 to access storage subsystem 140 (shown in FIG. 1) and may be, for example, a Fibre Channel adapter or a Small Computer System Interface (SCSI) adapter. Network adapter 270 provides storage server 120 with the ability to communicate with remote devices, such as the clients 110 (shown in FIG. 1), over a network and may be, for example, an Ethernet adapter.

Figure 3:
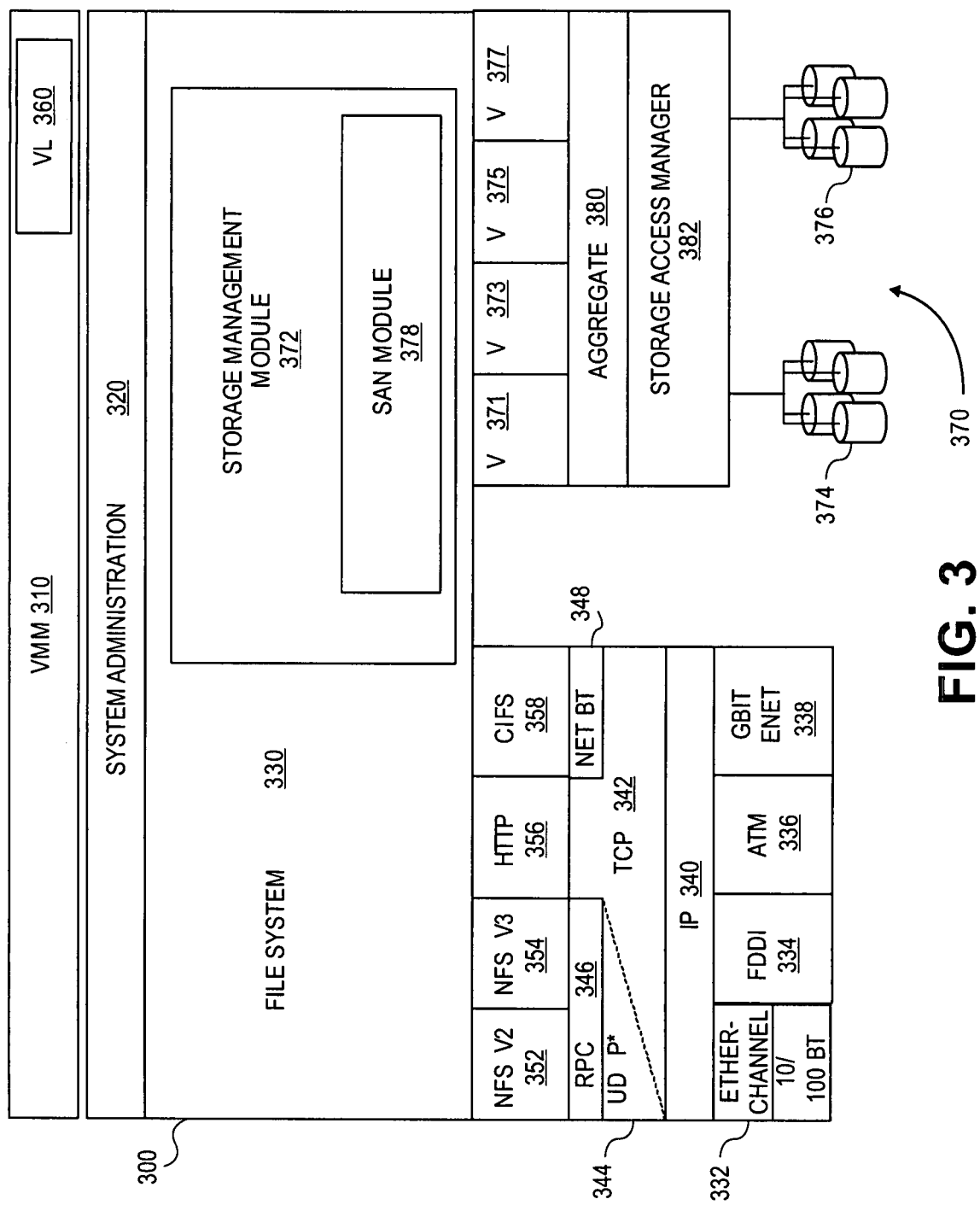
FIG. 3 is a block diagram illustrating selected aspects of the logical architecture of a storage system, according to one embodiment.

FIG. 3 is a block diagram illustrating selected aspects of the logical architecture of a storage system (e.g., its operating system), according to one embodiment. FIG. 3 further illustrates VMM 310 including VL 360, which are further described with references to FIGS. 4-6. In one embodiment, operating system 300 includes a collection of coupled processing modules to handle client requests (e.g., requests from host platforms 100, shown in FIG. 1). A request starts in the network drivers at the lower left, and moves up through the network protocol layers and the file system, eventually generating disk input/output (I/O) if necessary. When file system manager 330 finishes the request, it sends a reply back to the network. System administration layer 320 monitors and controls the modules below. In addition to the modules shown in FIG. 3, a simple real-time kernel may provide basic services such as process creation, memory allocation, message passing, and interrupt handling. In an alternative embodiment, operating system 300 may include more modules, fewer modules, and/or different modules.

In one embodiment, operating system 300 includes a number of network drivers to process client requests. The illustrated embodiment includes Ether-channel driver 332, Fiber Distributed Data Interface (FDDI) driver 334, Asynchronous Transfer Mode (ATM) driver 336, and gigabit Ethernet driver 338. In an alternative embodiment, operating system 300 may include more network drivers, fewer network drivers, and/or different network drivers.

Operating system 300 includes an implementation of Internet Protocol (IP) 340. In an embodiment, operating system 300 includes implementations of both Transmission Control Protocol (TCP) 342 and User Datagram Protocol (UDP) 344. In addition, the network layer may include implementations of Remote Procedure Call (RPC) 346 and NetBIOS over TCP/IP 348. Operating system 300 may also implement one or more of various higher-level network protocols, such as Network File System (NFS) 352, 354, Common Internet File System (CIFS) 358, and/or Hypertext Transfer Protocol (HTTP) 356.

File system 330 is application-layer software that manages the directory structure (e.g., the hierarchical structure) of the data stored in storage subsystem 370. For example, file system 330 manager manages read/write operations on the data stored in storage subsystem 370 (e.g., executes read/write operations on the disks in response to client requests). In one embodiment, file system manager 330 includes storage management module 372. In an alternative embodiment, storage management module 372 is implemented in a different layer of operating system 300 and/or is distributed across more than one layer (and/or more than one module) of operating system 300. As is further described below, with reference to FIGS. 4-5, storage management module 372 provides storage area network (SAN) module 378 to configure the common pool of storage provided by aggregate 380.

Operating system 300 includes volumes (V) 371, 373, 375, and 377 and aggregate 380. In one embodiment, volumes 371-377 are logical data containers that can be sized, resized, managed, and moved independently from the underlying physical storage. In the embodiment illustrated in FIG. 3, volumes 371-377 decouple what was, in conventional volumes, a direct connection between volumes and physical associated physical disks. This decoupling of virtual volumes and physical disks vastly increases the flexibility and storage efficiency of operation system 300.

In contrast to conventional systems, the underlying storage for a volume is no longer directly provided by disks. Instead, volumes 371-377 obtain storage from aggregate 380. The storage for Aggregate 380, in turn, is provided by storage subsystem 370. In one embodiment, storage access manager 382 determines where within the physical storage data is written. Storage access manager 382 implements a higher-level disk storage protocol, such as RAID (redundant array of independent disks,) while the storage driver (not shown) implements a lower-level storage device access protocol, such as Fiber Channel Protocol (FCP), iSCSI or other like storage access protocol, which may not be virtualized for (made accessible to) a virtual execution environment by VMM 310. In one embodiment, VL 360 provides virtualized (guest) hardware resources for the storage access protocols of storage access manager 382.

Accordingly, as described herein, a logical unit number (LUN) may refer to specific volumes, for example, volumes 371-377 for storage aggregate 380, as shown in FIG. 3. As further described herein, when such volumes are accessed using the FCP storage access protocol, the iSCSI storage access protocol for a host bus adaptor or a storage area network, the LUN may represent a virtual disk (storage device) to provide locally attached or direct attached physical storage for applications that require such locally attached storage. In one embodiment, DSA application 450, as shown in FIG. 4, is a storage utility that enables the volumes 371-377 to appear as locally attached physical storage (disks) of host platform 400. In one embodiment, multiple virtual disks may be created from a single volume 371-377.

FIG. 4 is a block diagram further illustrating host platform of FIG. 1 which is shown as platform 400 including a virtualization layer 460 to provide virtualized hardware resources within a virtual execution environment according to one embodiment. Representatively, host platform 400 includes VM server 410 including installed host hardware initiators 402. As described herein, host hardware initiators may include but are not limited to FCP host bus adaptors (FCP HBAs), iSCSI HBAs, or other like host hardware initiators for accessing a storage server according to a storage access protocol.

As further shown in FIG. 4, host platform includes virtual execution environment or VM 408 which includes guest OS 404, as well as data storage application (DSA) 450. In the embodiment illustrated, platform initialization software (not shown) may install data storage application 450 within an execution environment. As part of such installation, the initialization software or firmware may determine whether the execution environment is a virtual execution environment. Once determined to be a virtual execution environment, a connection may be established with a virtualization layer 460. Following the connection with virtualization layer 460, user credential may be provided for access to VM server 410.

In one embodiment, a virtual driver 452 is provided for VM 408 to obtain information regarding host hardware resources available from VM server 410. In one embodiment, VL 460 provides virtual driver 452 to acquire information regarding the installed host hardware initiators 402, which are inaccessible to guest OS 404, as well as DSA application 450 of VM 408. In one embodiment, virtual driver 452 fetches information regarding the host hardware initiator(s) 402 installed on VM server 410 using virtualization layer (VL) 460. In one embodiment, the data storage application may be, for example, a SnapDrive® application as provided by Network Appliance®, Inc. of Sunnyvale, Calif.

In contrast to conventional environments, DSA 450 may provide logical unit number (LUN) provisioning and snap shot management by accessing a storage server 420 using the host hardware initiator information 454. Conventionally, the guest OS 404 on a virtual machine does not have access to the underlying FCP/iSCSI host bus adaptors since the VMM or other VM server abstracts (FCP/iSCSI HBAs are unvirtualized) the underlining hardware. A user of DSA 450 does not see a list of guest hardware initiators as part of a create or connect to LUN functionality of DSA 450. However, by providing virtual driver 452, desired functionality may be provided by accessing the hardware resources of the host platform.

FIG. 5 further illustrates virtualization layer 460 which may be provided as a data link library (DLL) according to one embodiment. Representatively, virtualization layer 460 includes a virtualization interface 462. Upon initial loading of DSA application 450, the virtualization layer determines the configuration of the virtual execution environment as, for example, a VM server environment 462, a Microsoft®server environment 464 or other virtualization vendor implementation 466. Depending on the configuration of the host platform, virtualization interface 462 may provide the virtual driver initiator 452 (452-1, 452-2, 452-3) as required by the DSA application 450 to acquire the host hardware information 454 (FIG. 4) necessary to configure the resources of the host platform system such as, for example, the network attached storage of the host platform as provided by, for example, a storage server, as shown in FIGS. 1-3.

Figure 6:
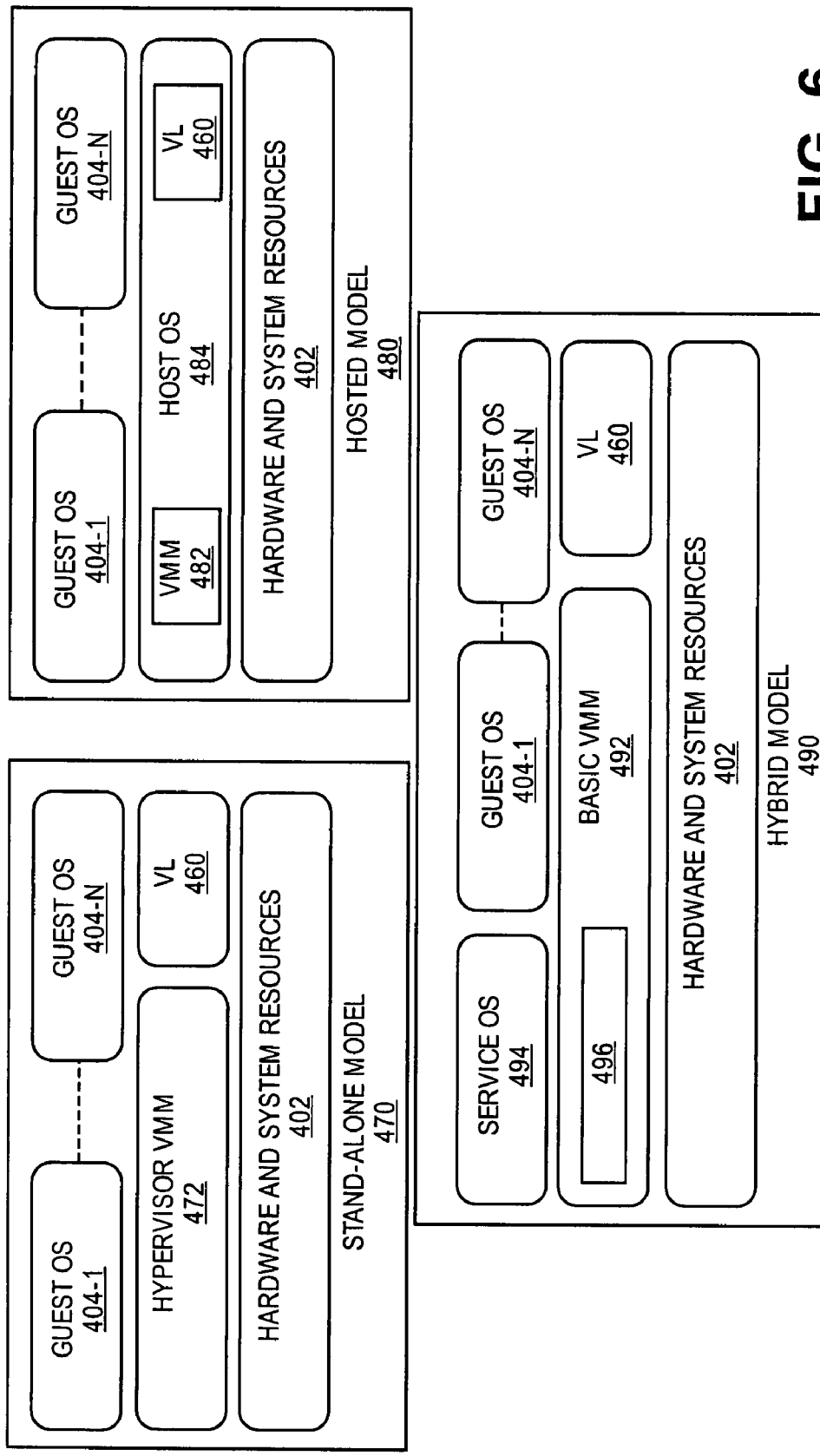
FIG. 6 is a block diagram illustrating alternative platform configurations of the host platforms illustrated in FIGS. 1, 2 and 4 according to one embodiment.

FIG. 6 is a block diagram illustrating various configurations for host platforms 100/200/400, as shown in FIGS. 1, 2 and 4. As illustrated in FIGS. 1, 2 and 4, host platforms are shown according to a standalone VMM model 470. In a standalone VMM model 470, the VMM, which may be referred to as "a VM server," runs directly on top of hardware resources 402. In addition, virtualization layer (VL) 460 operates, in combination with VM server 472, to provide a virtualization hardware resources for guest OS 404. However, the various configurations for host platforms 100/200/400 are not limited to the standalone VMM model 470 illustrated in FIGS. 1, 2 and 4. In one embodiment, the host platforms may be configured according to a host VMM configuration 480, as shown in FIG. 6.

Representatively, the host VMM model 480 includes VMM 482, which runs on top of host operating system (OS) 484. In a further embodiment, one or more of the host platforms 100/200/400, as shown in FIGS. 1, 2 and 4, may be configured according to a hybrid VMM model 490, as shown in FIG. 6. Representatively, hybrid VMM model 490 is comprised of service OS 494 and micro-hypervisor (basic VMM)

492, including optimized API 496. According to the hybrid VMM model 490, micro-hypervisor 492 may be responsible for CPU/memory resource virtualization and domain scheduling. Service OS 494 may be responsible for VM management and device virtualiization/simulation.

In accordance with the embodiments illustrated in FIG. 6, virtualization of one or more host hardware resources for a virtual execution may be performed according to any of the host platform configuration 470/480/490 shown in FIG. 6 or other like configurations, to provide non-virtualized host platform resources for at least one virtual execution environment. Procedural methods for implementing one or more of the described embodiments are provided below.

Figure 7:
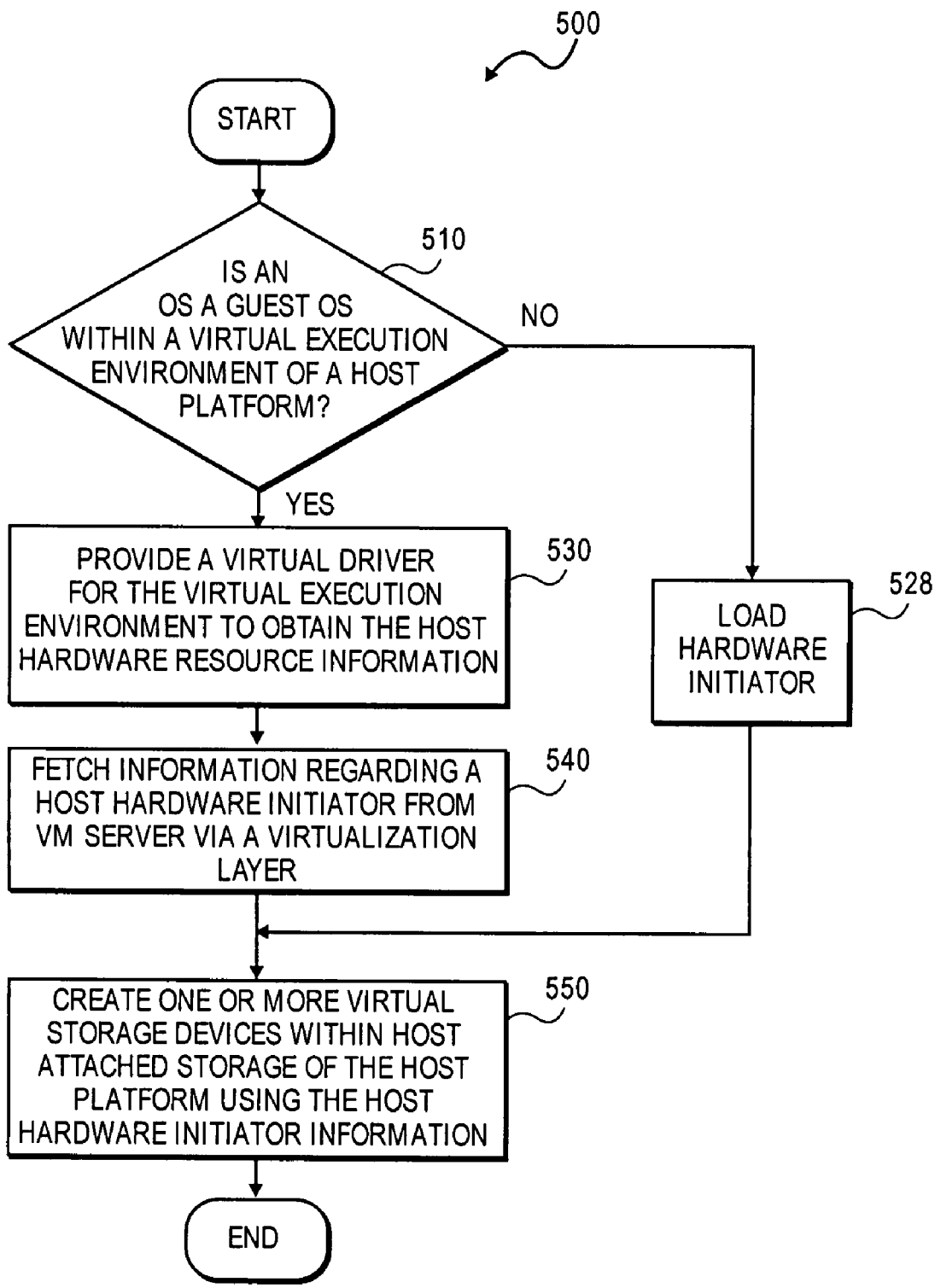
FIG. 7 is a flowchart illustrating a method for providing virtualized hardware resources within a virtual execution environment according to one embodiment.

Turning now to FIG. 7, the particular methods associated with the embodiments are described in terms of computer software and hardware with reference to a flowchart. The methods to be performed by a computing device (e.g., a storage server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems.

In addition, the embodiments are not described with reference to any particular programming language. It will be appreciated that a variety of programming languages may be used to implement the embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating certain aspects of a method 500 for providing virtualized hardware resources within a virtual execution environment, according to one embodiment. Referring to process block 510, process block 510 determines whether a current operating system (OS) is a guest OS within a virtual execution environment of a host platform. In one embodiment, as part of the installation of a data storage application (DSA) for example, as shown in FIGS. 1 and 4, installation of the application determines whether the execution environment in which the DSA application is installed is a virtual execution environment, as described herein.

Referring again to FIG. 7, when a virtual execution environment is identified, at process block 530, a virtual driver is provided for the virtual execution environment to obtain information regarding a host hardware resources from a available virtual machine (VM) server, virtual machine monitor (VMM) or other like partition server, via a virtualization layer. As indicated above, a virtual machine monitor (VMM) creates a virtual execution environment or VM that runs on a host platform to facilitate, for the guest OS or other software application, the abstraction of one or more VM. Accordingly, in one embodiment, a virtualization layer is provided to enable access to host platform resources by providing virtualized hardware resources to the applications running within the virtualization execution environment.

Referring again to FIG. 7, at process block 540, the virtual driver fetches host hardware initiator information using the virtualization layer. At process block 550, the host hardware initiator information is provided to a DSA application. In one embodiment, DSA application creates one or more virtual disks within host attached storage of the host platform using the host hardware initiator information. Alternatively, if the DSA application is installed within a non-virtualized execution environment, a hardware initiator of the host platform may be loaded at process block 528 and the creation of the one or more virtual disks at process block 550 is performed using the host hardware interface.

Figure 8:
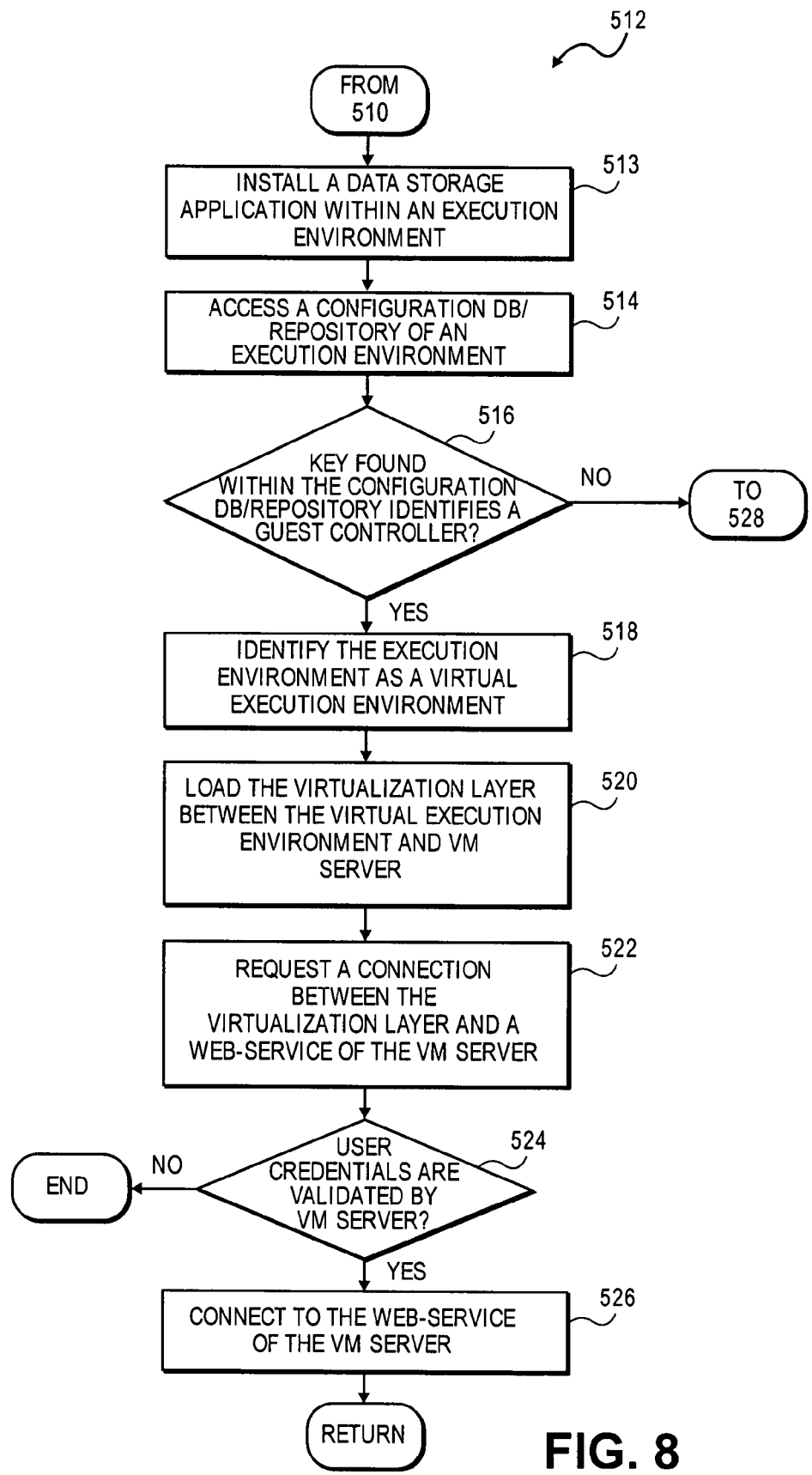
FIG. 8 is a flowchart illustrating a method for determining whether a data storage application is installed within a virtual execution environment according to one embodiment.

FIG. 8 is flow chart illustrating a method 512 for determining whether a data storage application is installed within a virtual execution environment, according to one embodiment. At process block 513, a data storage application or DSA application is installed within an execution environment. In the embodiment, platform initialization software may install a DSA application as well as a virtualization layer within an execution environment. Alternatively, the DSA application is installed by an administrator, a user, or invoked by a storage management application using software download from a server, installed from a portable storage medium or other like machine readable storage medium.

Referring again to FIG. 8, at process block 514, a configuration database (DB)/information repository of the execution environment is accessed. Once accessed, at process block 5.16 it is determined whether a key found within the configuration database (DB)/information repository identifies a guest controller. In one embodiment, the configuration database (DB)/information repository is a registry of the Windows® OS, as provided by Microsoft® Corporation of Redmond, Wash. When such guest controller is identified, at process block 518 the execution environment is identified as a virtual execution environment since guest resources are available within the execution environment that are virtualized (provided) by a VMM or VM server of the host platform for the virtual execution environment.

At process block 520, the virtualization layer is loaded between the virtual execution environment and the VM server or host platform resources. At process block 522, a connection is requested between the virtualization layer and a web-service of the host server. Subsequently, process block 554 determines whether supplied user credentials are valid for access to a VM server. Once verified, at process block 526 the request connection is established to the web service of the VM server. In one embodiment, the web service is, for example, an application programming interface (API) of the VM server such as, for example, a VMWare ESX server version 3.0, as provided by VMWare, Inc. of Palo Alto, Calif.

Figure 9:
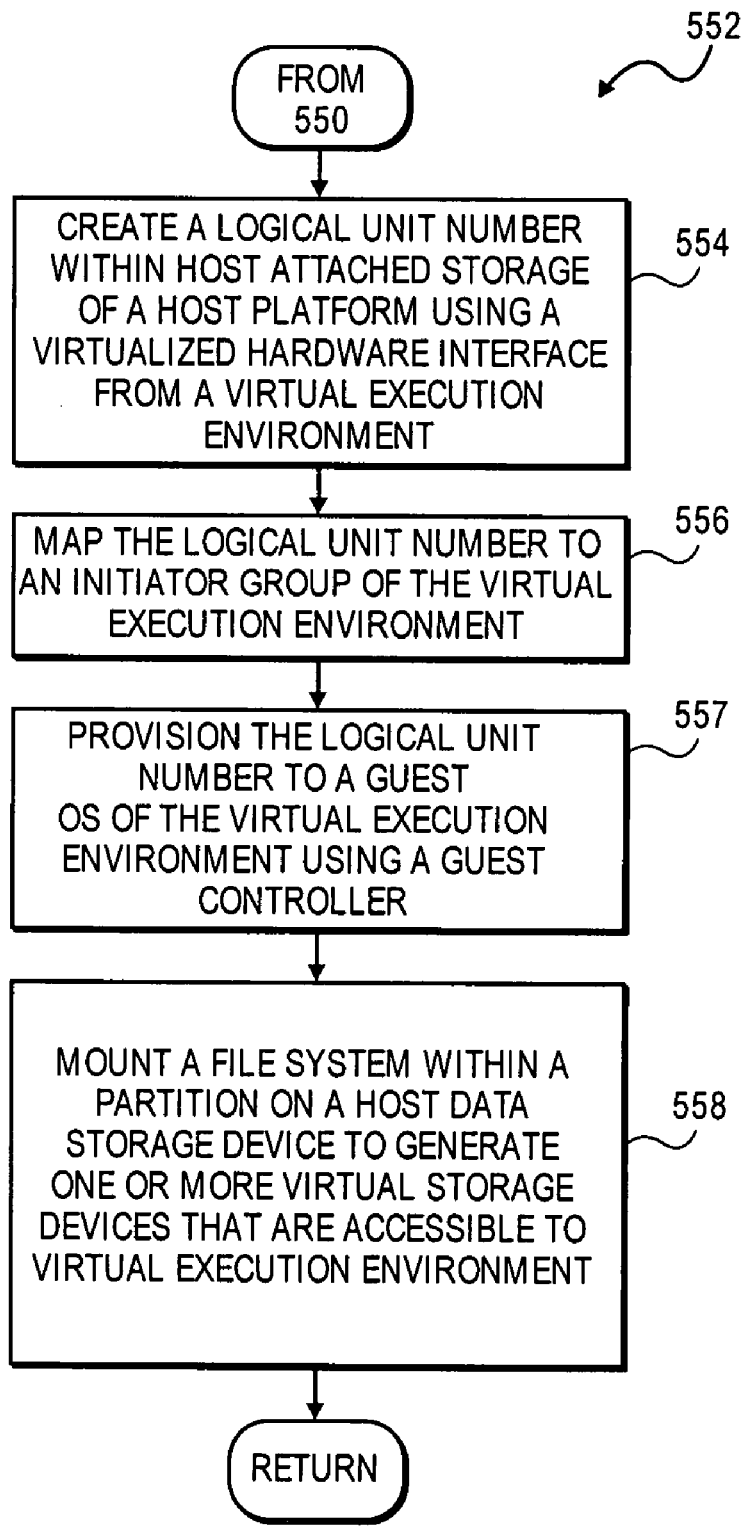
FIG. 9 is a flowchart illustrating a method for creating the one or more virtual storage devices according to one embodiment.

FIG. 9 is a flow chart illustrating a method 552 for creating the one or more virtual disks of process block 550, as shown in FIG. 7, according to one embodiment. At process block 554, a logical unit number (LUN) may be created within host direct/network attached storage of a host platform using a host hardware interface such as the ZAPI interface, as provided by Network Appliance®, Inc. of Sunnyvale, Calif. In one embodiment, the LUN is created from a virtual execution environment using host hardware initiator information that is provided by a virtualized hardware driver, since a guest hardware driver is not provided by VM server or virtual machine monitor of the host platform.

At process block 556, the logical unit number (LUN) is mapped to an initiator group of the virtual execution environment. In one embodiment, mapping of the LUN to the initiator group refers to the identification of a guest controller from which the LUN may be accessed from the virtual execution environment. At process block 557, the LUN may be provisioned to the guest OS of the virtual execution environment using the identified guest controller of the virtual execution environment. At process block 558, a file system may be mounted within a partition of a host data storage device to generate one or more virtual disks that are accessible to the virtual execution environment using, for example, the guest OS. As a result, the LUN may appear as a locally attached disk of the virtual execution environment.

Figure 10:
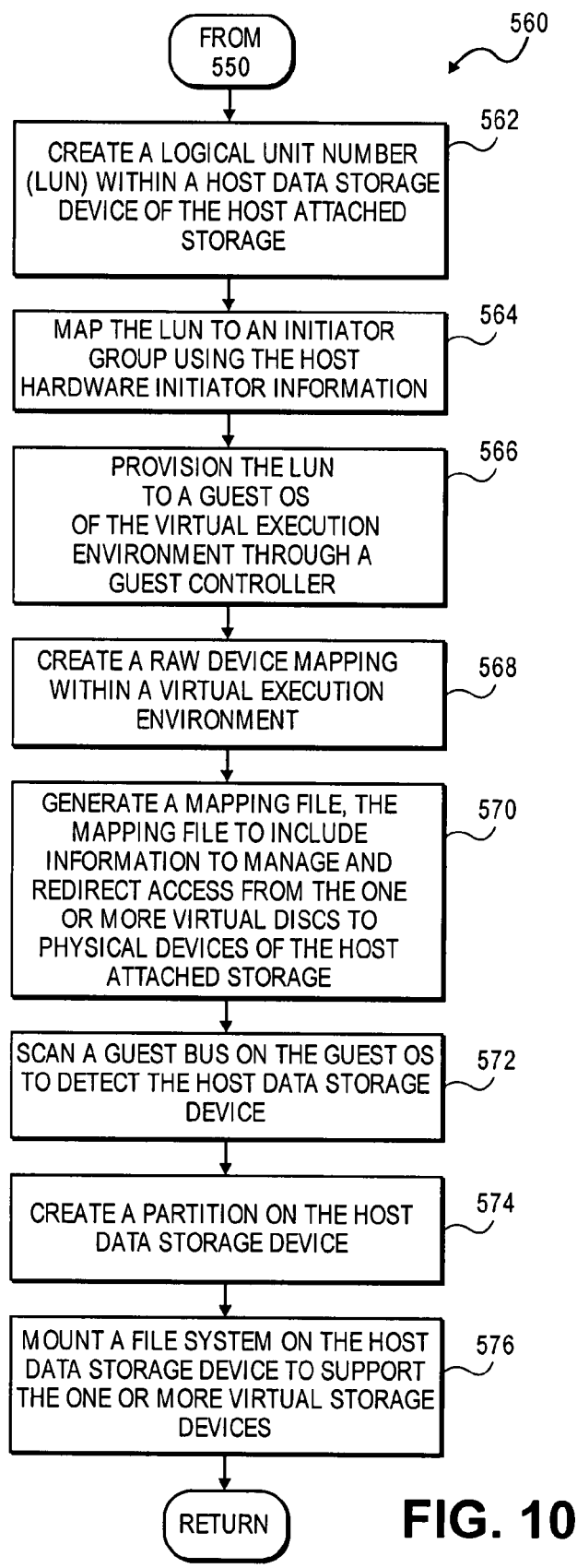
FIG. 10 is a flowchart illustrating of a method for creating the virtual storage devices according to one embodiment.

FIG. 10 is a flow chart illustrating a method at 560 for creating the virtual disks of process block 550 of FIG. 7, according to one embodiment. At process block 562, the LUN is created within a host data storage device of the host attached storage. At process block 564, the LUN is mapped to an initiator group using the host hardware initiator information. At process block 566, the LUN is provisioned to a guest OS of the virtual execution environment through a guest controller. At process block 568, a raw device mapping is created within the virtual execution environment. In one embodiment, the raw device mapping may be generated within a virtual machine file system (VMFS.)

In one embodiment, the initiator group refers to an OS device name of a virtual controller provided by a VMM server of the host platform. For example, the VM server may provide virtual FCP/SCSI controllers, or other like HBA storage access protocol controller, which may be referred to herein as guest controllers. In one embodiment, while creating a write device mapping for a newly created LUN, the VM server may specify a controller key of the virtual SCSI/FCP controller from which the LUN is accessible. In one embodiment, this controller key is returned so that the associated SCSI port and SCSI device can be scanned so that the newly created LUN becomes available to the DSA application, which may be referred to herein as LUN provisioning. In other words, when a virtual disk is generated for a guest OS, the VM server provides a data object that has a unique key that distinguishes a guest controller from other devices in the same virtual machine.

In one embodiment, the generation of a virtual disk provides a controller key which denotes a virtual SCSI/FCP controller virtual disk. Using this controller key, the controller from which the virtual device is accessible can be obtained. In one embodiment, such controllers may appear in information repository or configuration database as SCSI ports. In one embodiment, as part of DSA installation, each guest controller of the virtual machine is enumerated to enable each host hardware initiator port to be associated with each SCSI port. Based on such association, the controller key would determine the associated SCSI port and SCSI device, such that a guest bus can be rescanned to provide the guest OS with access to the generated virtual disk.

At process block 570, a mapping file is generated. In one embodiment, the mapping file includes information management metadata to redirect access from the one or more virtual disks to physical devices of the host direct/network attached storage. At process block 572, a guest bus may be scanned on the guest OS to detect the host data storage device. In one embodiment, the lack of a guest hardware initiator requires enumeration of the ports coupled to or available to the virtual execution environment. Accordingly, based on such scanning, the host data storage device in which the LUNs are generated may be detected to enable access thereof to the guest OS of the virtual execution environment. At process block 574, a partition is created on the host data storage device. At process block 576, a file system is mounted on the host data storage device to support the one or more virtual disks.

Figure 11:
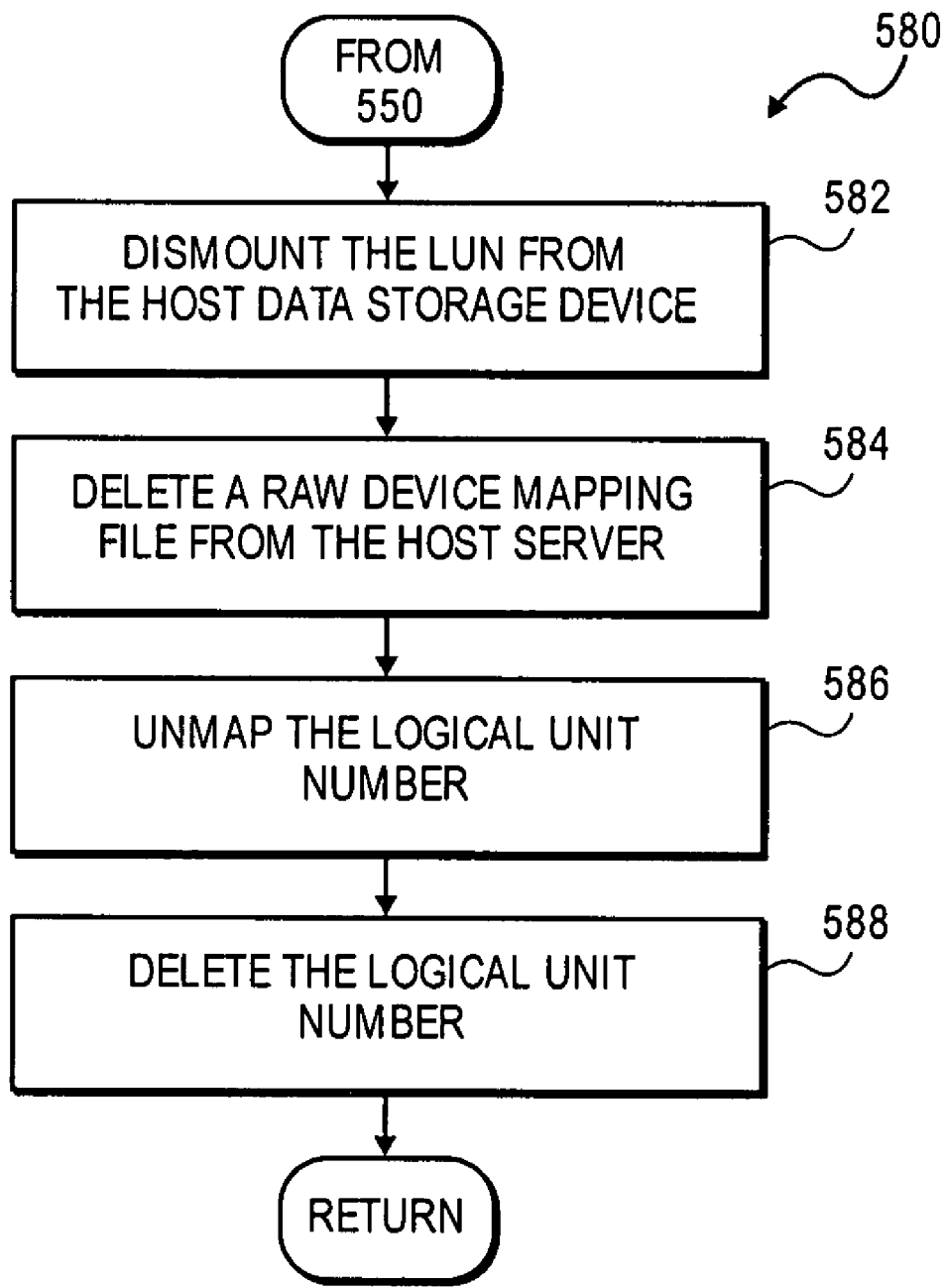
FIG. 11 is a flowchart illustrating a method for removing one or more virtual storage devices according one embodiment.

FIG. 11 is a flow chart illustrating a method 580 for removing one or more virtual disks as created, for example, at process block 550 of FIG. 7 according to one embodiment. At process block 582, the LUN is dismounted from the host data storage device. At process block 584, the raw device mapping file is deleted from the host server. At process block 586, the logical unit number is unmapped. Finally, at process block 588, the logical unit number is deleted from the host attached storage. In one embodiment, the raw device mapping allows a special file in a virtual machine file system (VMFS) volume to act as a proxy for a raw device. The mapping file contains metadata used to manage or redirect disk access to the physical device. The mapping file gives or provides many advantage over a virtual disk of the VMFS file system, while providing some of the advantages of direct access to a physical device. In one embodiment, such raw device mapping merges VMFS manageability with raw device access.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   determining whether an operating system (OS) is a guest OS running within a virtual execution environment of a host platform;
   if an OS is determined to be a guest OS within a virtual execution environment, providing a virtual driver for the virtual execution environment, where no corresponding guest driver is available to the virtual execution environment;
   fetching, by the virtual driver, host hardware initiator information from a host server via a virtualization layer; and providing the host hardware initiator information to enable creation of one or more virtual storage devices within host attached storage of the host platform.

2. The method of claim 1, wherein determining whether the current OS is a guest OS comprises:
   accessing a configuration database of an execution environment; and
   identifying the execution environment as a virtual execution environment if a key is found within the configuration database identifies a virtual controller.

3. The method of claim 2, further comprising:
   loading the virtualization layer between the virtual execution environment and the host server;
   requesting a connection between the virtualization layer and a web-service of the host server;
   providing credentials of a user to the virtualization layer; and
   connecting to the web-service of the host server if the user credentials are valid.

4. The method of claim 1, wherein determining whether the current OS is a guest OS further comprises:
   installing a data storage application within an execution environment;
   if the execution environment is identified as a virtual execution environment, providing user information to access the host server; and
   establishing a connection between the virtual execution environment and the host server via the virtualization layer.

5. The method of claim 1, wherein fetching information regarding the host hardware initiator comprises:
   detecting one or more host bus adaptors installed on the host server of the host platform; and
   generating the virtualized hardware initiator according to the host bus adaptors.

6. The method of claim 1, further comprising:
   scanning a guest bus of the virtual execution environment to provide the guest OS with access to the virtual storage devices; and
   granting a data storage application installed within the virtual execution environment with access to the virtual storage devices.

7. The method of claim 1, wherein providing the host hardware initiator information further comprises:
   creating a logical unit number (LUN) within a data storage device of the host attached storage;
   mapping the LUN to an initiator group using the host hardware initiator information; and
   provisioning the LUN to the guest OS of the virtual execution environment through a guest controller.

8. The method of claim 7, further comprising:
   creating a raw device mapping within a virtual execution environment file system volume; and
   generating a mapping file, the mapping file to include information to manage and redirect access from the one or more virtual storage devices to physical devices of the host attached storage.

9. The method of claim 8, further comprising:
   scanning a guest bus on the guest OS to detect a guest data storage device;
   creating a partition on the guest data storage device; and
   mounting a file system on the guest data storage device to generate the one or more virtual disks.

10. The method of claim 1, further comprising:
    dismounting the LUN from the guest data storage;
    deleting a raw device mapping file from the host server;
    unmapping the logical unit number; and
    deleting the logical unit number.

11. A method comprising:
    requesting information regarding a host hardware initiator of the host server of a host platform;
    creating, from a virtual execution environment, a logical unit number within host attached storage of the host platform using host hardware initiator information received from a virtual driver, where no corresponding guest driver is available to the virtual execution environment;
    mapping the logical unit number to an initiator group of the virtual execution environment;
    provisioning the logical unit number to a guest operating system of the virtual execution environment using a virtual controller; and
    mounting a file system within a partition on a virtual data storage device to generate one or more virtual storage devices within the host attached storage that are accessible to the guest operating system of the virtual execution environment.

12. The method of claim 11, wherein prior to creating the logical unit number, the method further comprising:
    loading the virtualization layer between the virtual execution environment and the host server;
    requesting a connection between the virtualization layer and a web-service of the host server;
    providing credentials of a user to the virtualization layer; and
    establishing the connection to the web-service of the host server if the user credentials are valid.

13. The method of claim 12, wherein loading the virtualization layer comprises loading a dynamic link library.

14. The method of claim 11, wherein prior to creating the logical unit number, the method further comprising:
    installing a data storage application within an execution environment;
    accessing a registry of the execution environment;
    identifying the execution environment as a virtual execution environment if a key is found within the registry identifies a guest controller;
    if the execution environment is identified as a virtual execution environment, providing user information to access the host server; and
    establishing a connection between the virtual execution environment and the host server via the virtualization layer.

15. A system comprising:
    a host platform including a virtual execution environment and communicably coupled to a storage server to enable access to host attached storage;
    the virtual execution environment including a guest operating system (OS) including an installed data storage application; and
    a virtualization layer to provide a virtual driver for the virtual execution according to a host hardware initiator installed on a host server of the host platform, where no corresponding guest driver is available within the virtual execution environment, the virtual driver to fetch information regarding a host hardware initiator installed on the host server of the host platform, the virtualization layer to provision a logical unit number generated within the host attached storage of the host platform to the guest OS of the virtual execution environment.

16. The system of claim 15, further comprising:
    logical unit number creation logic to mount a file system within a partition on a guest data storage device of the virtual execution environment to generate one or more virtual storage devices within the host attached storage that are accessible to the guest operating system of the virtual execution environment.

17. The system of claims 15, further comprising:
initialization logic to load the virtualization layer between the virtual execution environment and the host server, to request a connection between the virtualization layer and a web-service of the host server, to provide credentials of a user to the virtualization layer and to establish the connection to the web-service of the host server if the user credentials are valid.

18. An article of manufacturing comprising:
a machine readable storage medium providing instructions that, when executed by a machine, cause the machine to:
install a data storage application within an execution environment;
if the execution environment is identified as a virtual execution environment, provide user information to establish a connection with a host server of a host platform via a virtualization layer;
generate a virtual driver for the virtual execution environment to fetch information regarding a host hardware initiator of the host server using the virtualization layer; and
provide a host hardware initiator information to the data storage application to enable the creation of one or more virtual storage devices within host attached storage of the host server.

19. The article of manufacturing of claim 18, wherein the instructions that, when executed by the apparatus, cause the apparatus to provide the virtualized hardware initiator further cause the apparatus to:
create a logical unit number (LUN) within a data storage device of the host attached storage;
map the LUN to an initiator group using the host hardware initiator information; and
provision the LUN to the guest OS of the virtual execution environment through a guest controller.

20. The article of manufacturing of claim 18, further comprising the instructions that, when executed by the apparatus, further cause the apparatus to:
create a raw device mapping within a virtual execution environment file system volume;
generate a mapping file, the mapping file to include information to manage and redirect access from the one or more virtual disks to physical devices of the host attached storage;
scan a guest bus on the guest OS to detect a guest data storage device;
create a partition on the guest data storage device; and
mount a file system on the guest data storage device to generate the one or more virtual storage devices.

* * * * *